(12) United States Patent
Moeker

(10) Patent No.: US 11,021,131 B2
(45) Date of Patent: Jun. 1, 2021

(54) SAFETY BELT DEVICE FOR A VEHICLE

(71) Applicant: Volkswagen Aktiengesellschaft, Wolfsburg (DE)

(72) Inventor: Carsten Moeker, Ruehen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 121 days.

(21) Appl. No.: 16/519,830

(22) Filed: Jul. 23, 2019

(65) Prior Publication Data

US 2019/0344746 A1 Nov. 14, 2019

Related U.S. Application Data

(63) Continuation of application No. PCT/EP2018/051370, filed on Jan. 22, 2018.

(30) Foreign Application Priority Data

Jan. 23, 2017 (DE) .................... 10 2017 201 016.9

(51) Int. Cl.
*B60R 22/19* (2006.01)
*B60R 22/28* (2006.01)
*B60R 22/18* (2006.01)

(52) U.S. Cl.
CPC .............. *B60R 22/19* (2013.01); *B60R 22/28* (2013.01); *B60R 2022/1806* (2013.01); *B60R 2022/287* (2013.01)

(58) Field of Classification Search
CPC . B60R 22/19; B60R 22/28; B60R 2022/1806; B60R 2022/287; B60R 2022/286; B60R 22/195

USPC ........................................................ 280/808
See application file for complete search history.

(56) References Cited

U.S. PATENT DOCUMENTS

| 3,026,972 A | 3/1962 | Hendry et al. |
| 5,340,152 A | 8/1994 | Föhl |
| 5,350,194 A | 9/1994 | Föhl |

(Continued)

FOREIGN PATENT DOCUMENTS

| CN | 2606697 Y | 3/2004 |
| DE | 24 36 325 A1 | 4/1975 |

(Continued)

OTHER PUBLICATIONS

Chinese Office Action dated Dec. 24, 2020 in corresponding application 201880005283.5.

*Primary Examiner* — Paul N Dickson
*Assistant Examiner* — Kurtis Nielson
(74) *Attorney, Agent, or Firm* — Muncy, Geissler, Olds & Lowe, P.C.

(57) ABSTRACT

A safety belt arrangement for a vehicle, with a belt force limiting unit which is constructed as a piston/cylinder assembly having a piston tube and a piston, which in the event of the belt force being limited is displaceable by a force limiting path in the piston tube, while expanding and plastically deforming the latter, whereby the belt force exerted on a vehicle occupant is limited to a predefined level of force. According to the invention, at least one tube element, which can be pushed telescopically onto the piston tube to form a double tube structure, is provided for setting the force level course over the force limiting path.

12 Claims, 5 Drawing Sheets

(56) References Cited

U.S. PATENT DOCUMENTS

| | | | | |
|---|---|---|---|---|
| 5,358,275 A | * | 10/1994 | Fohl | B60R 22/28 |
| | | | | 280/806 |
| 5,480,190 A | * | 1/1996 | Fohl | B60R 22/1952 |
| | | | | 280/806 |
| 5,664,807 A | * | 9/1997 | Bohmler | B60R 22/1952 |
| | | | | 280/805 |
| 5,871,235 A | * | 2/1999 | Wier | B60R 22/4633 |
| | | | | 280/806 |
| 5,984,357 A | * | 11/1999 | Yasuda | B60R 22/1955 |
| | | | | 280/806 |
| 6,135,564 A | * | 10/2000 | Wier | B60R 22/28 |
| | | | | 280/805 |
| 6,199,954 B1 | | 3/2001 | Holzapfel | |
| 8,091,923 B2 | | 1/2012 | Dong | |
| 8,210,569 B2 | * | 7/2012 | Eberle | B60R 22/1952 |
| | | | | 280/806 |
| 2002/0113425 A1 | * | 8/2002 | Betz | B60R 22/1952 |
| | | | | 280/806 |
| 2004/0227403 A1 | * | 11/2004 | Wang | B60R 22/1952 |
| | | | | 307/10.1 |
| 2009/0326765 A1 | * | 12/2009 | Dong | B60R 22/28 |
| | | | | 701/45 |
| 2015/0232060 A1 | * | 8/2015 | Warner | B60R 22/19 |
| | | | | 242/410 |
| 2019/0071053 A1 | * | 3/2019 | Imanaka | B60R 22/44 |

FOREIGN PATENT DOCUMENTS

| | | | | |
|---|---|---|---|---|
| DE | 40 20 600 A1 | | 1/1991 | |
| DE | 42 24 924 A1 | | 2/1994 | |
| DE | 195 11 457 A1 | | 10/1996 | |
| DE | 29718659 U1 | * | 2/1998 | B60R 22/28 |
| DE | 298 06 199 U1 | | 8/1998 | |
| DE | 298 16 784 U1 | | 12/1998 | |
| DE | 202 09 370 U1 | | 10/2002 | |
| DE | 10 2006 053 563 A1 | | 5/2008 | |
| DE | 10 2007 034 401 A1 | | 1/2009 | |
| DE | 10 2009 030 511 A1 | | 3/2010 | |
| EP | 0 558 963 A2 | | 9/1993 | |
| EP | 0 568 327 A2 | | 11/1993 | |
| EP | 0614789 A1 | * | 9/1994 | F15B 15/19 |
| EP | 0 911 228 A2 | | 4/1999 | |
| GB | 2327919 A | | 2/1999 | |
| JP | 2009248955 A | * | 10/2009 | |

* cited by examiner

SAFETY BELT DEVICE FOR A VEHICLE

This nonprovisional application is a continuation of International Application No. PCT/EP2018/051370, which was filed on Jan. 22, 2018, and which claims priority to German Patent Application No. 10 2017 201 016.9, which was filed in Germany on Jan. 23, 2017, and which are both herein incorporated by reference.

BACKGROUND OF THE INVENTION

Field of the Invention

The present invention relates to a safety belt arrangement for a vehicle.

Description of the Background Art

A safety belt arrangement may comprise a three-point safety belt, consisting of a lap belt and a shoulder belt, as well as a safety belt retractor on which winding drum the safety belt can be wound. In the event of accident-related vehicle deceleration, the winding drum of the safety belt retractor in a safety belt worn by the vehicle occupant is blocked by means of a blocking device installed therein to prevent the belt from pulling out. As a result, a belt force acts on the vehicle occupant. In order to limit the belt force acting on the vehicle occupant, a belt force limiting unit may be provided, by means of which the belt force exerted on a vehicle occupant is limited to a predefined force level.

GB 2 327 919 A discloses a generic safety belt arrangement for a vehicle which has such a belt force limiting unit. This is realized as a piston/cylinder assembly with a radially outer piston tube and a piston that is radially displaceable within the piston tube. In the event of the belt force being limited, the piston is displaced in the axial direction by a force limiting path, while expanding and plastically deforming said piston tube, whereby the belt force exerted on the vehicle occupant is limited.

In GB 2 327 919 A, the piston tube has three tube segments successively arranged in the axial direction, at which inner circumference axial webs evenly distributed around the circumference are integrally formed. To set a force characteristic curve (i.e., the belt force level over the force limiting path), the tube segments have different numbers of axial ribs. Similarly designed is the belt force limiting unit constructed in EP 0 568 327 A2, the piston tube of which, when viewed over the force limiting path, has a varying internal cross section. The provision of cross sections varying in the axial direction inside the piston tube, however, is associated with a high manufacturing cost. In addition, due to the axial webs in GB 2 327 919 A, which are made of a uniform material and integrally formed on the piston tube inner circumference, factory changes of the force characteristic curve of the belt force limiting unit can only be made with high tooling costs.

From DE 42 24 924 A1, which corresponds to U.S. Pat. No. 5,340,152, a further belt force limiting unit is known in which the material thickness of the piston tube used therein is increased in the axial direction.

SUMMARY OF THE INVENTION

It is therefore an object of the present invention to provide a safety belt arrangement for a vehicle, which belt force limiting unit allows for a simple adjustment of the force characteristic curve of the belt force limiting unit.

According to an exemplary embodiment of the invention, an inner cross section of the piston tube varying in the axial direction is omitted. Instead, a tube element is provided as a separate component. The tube element can be telescopically pushed onto the piston tube to form a double tube structure. Depending on the axial position of the tube element pushed onto the piston tube, the force characteristic curve (i.e., the force level curve over the force limiting path) can be set in a simple manner in terms of manufacturing technology and without great tooling costs. By way of example, the tube element may be designed simply annularly (i.e., with a very short tube length) or may have a predetermined longer tube length, which, however, may be designed to be significantly shorter than the tube length of the piston tube. In the assembled state, therefore, at least one section of the piston tube is enclosed by the tube element and at least one piston tube section is not covered by the tube element.

In terms of manufacturing technology, the inner diameter of the tube element can be designed to be greater by a slight play than the outer diameter of the piston tube. In this way, in the manufacturing process, the tube element can be smoothly moved to its predefined axial position. In the predefined axial position, the tube element can be fixed in any manner on the piston tube or on an adjoining component, in particular on the vehicle body, for example by means of a non-positive, material and/or positive connection. In terms of manufacturing technology, it is preferred if the tube element is fastened to the piston tube by means of an adhesive or embossment connection.

Such a fixed connection between the tube element and the piston tube can be omitted. Instead, the tube element may be realized as a fastening clip which circumferentially surrounds the piston tube at a predetermined axial position. The fastening clip may have a radially outwardly projecting fastening tab, by means of which the fastening clip can be fastened to an adjoining component, in particular to the vehicle body. In this way, the fastening clip remains loosely attached to or easily detachable from the piston tube even in the assembled state.

In view of the easy adjustment of the force characteristic curve of the belt force limiting unit, it is advantageous when the above-mentioned fastening tab of the tube element has an elongated hole for screwing to the adjoining component, in particular the vehicle body. The longitudinal extent of the elongated hole is preferably aligned axially parallel to the piston tube. By means of the tube element designed as a fastening clip, not only a simple adjustment of the force characteristic curve is provided, but in a dual function, the unit is also prevented from rotating by means of a deflection fitting and a force limiting unit.

In a technical implementation, the piston tube can be designed with a constant internal and external diameter (i.e., with a constant internal cross section) on both its inner and outer circumferences over the entire length of the tubing, as well as is preferably formed in a smooth cylindrical manner. In this way, the piston tube can be provided in a simple cylindrical design geometry, i.e., without a specific internal or external structure. In the same way, the tube element can also be designed with a constant internal and external diameter on both its inner and outer circumferences over the entire length of its tubing, and also be formed in a smooth cylindrical manner.

The force characteristic curve of the belt force limiting unit is set by means of the axial position of the tube element on the piston tube. By way of example, the belt force limiting unit may have a progressive, degressive or wave-like force characteristic curve. For a progressive force level course, the tube element may be mounted on the piston tube at the end of the force limiting path. Instead, for a degressive force level course, the tube element may be attached to the piston tube at the beginning of the force limiting path. For a wave-like force level course, the tube element can be fastened to a middle section of the piston tube.

The belt force limiting unit according to the invention can be implemented in a safety belt arrangement which by way of example has a three-point safety belt comprising a lap belt and a shoulder belt. In the fastened state, the safety belt can be detachably connected to a driver's safety belt buckle by means of a belt tongue. The safety belt buckle can be attached to the vehicle body via a cable element as well as via the force limiting unit. In this case, the cable element may be guided with its cable end through the piston tube of the belt force limiting unit and connected to the piston. The cable element can be guided starting from the safety belt buckle through a vehicle body-side deflection fitting by cable deflection, wherein the deflection fitting can be fixedly mounted on the vehicle body. In the further course, the belt force limiting unit can join the deflection fitting. In this case, the deflection fitting can have a support contour against which in the event of the belt force being limited, the piston tube can be supported with its side facing away from the piston.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
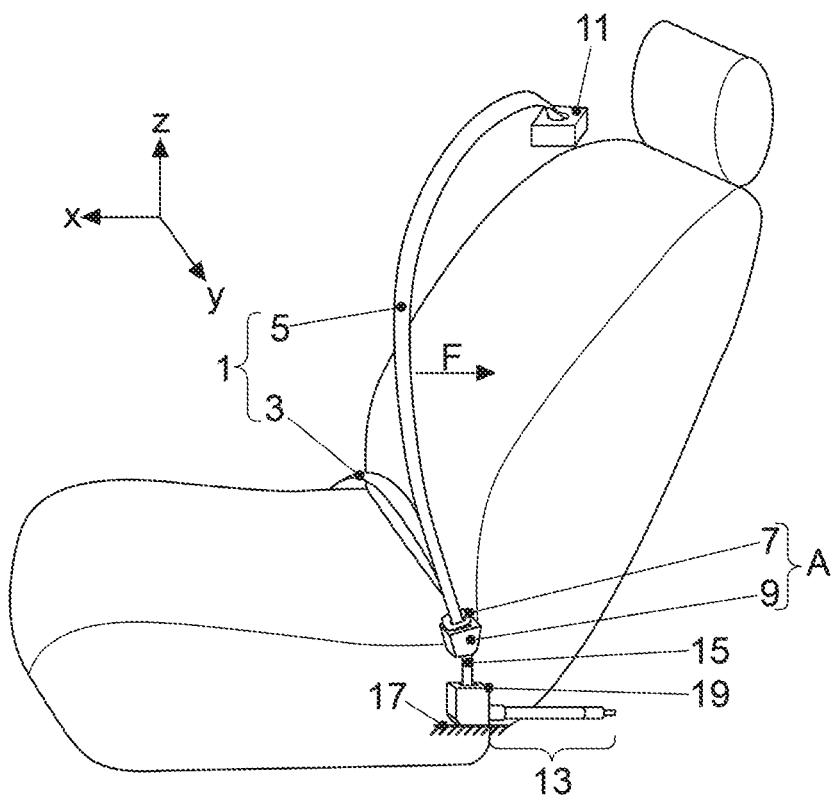
FIG. 1 is a perspective view of a safety belt arrangement with a fastened safety belt, but without vehicle occupants.

FIG. 1 shows a vehicle seat with an associated safety belt arrangement, the safety belt 1 of which is fastened, but without vehicle occupants. Consequently, in the vehicle transverse direction y, a lap belt 3 of the safety belt 1 extends between a vehicle-internal attachment point and an attachment point A outside the vehicle. The vehicle-internal attachment point A located at the height of the pelvic region is designed to be detachable, namely with a belt tongue 7 retained on the safety belt 1 and a cooperating, fixed safety belt buckle 9 into which the belt tongue 7 is inserted. At about shoulder height, there is a third vehicle-external attachment point. This is realized in current practice by a deflection fitting, not shown, which is mounted on a vehicle pillar, not shown, about which the shoulder belt 5 is guided to a belt retractor 11 installed in the vehicle pillar, in which the safety belt 1 can be wound on a winding drum. The belt retractor 11 has a blocking unit in common practice. In a safety belt 1 fastened to the vehicle occupant, in the event of an accident-related vehicle deceleration, the winding drum of the belt retractor 9 is blocked by means of the blocking unit in order to prevent the belt from pulling out. As a result, a belt force F (FIG. 1) from the safety belt 1 acts on the vehicle occupant. If the belt force F exceeds a predetermined limit value, then a belt force limiting unit 13 is activated, by means of which the belt force F exerted on the vehicle occupant can be limited to a predefined force level.

Figure 2:
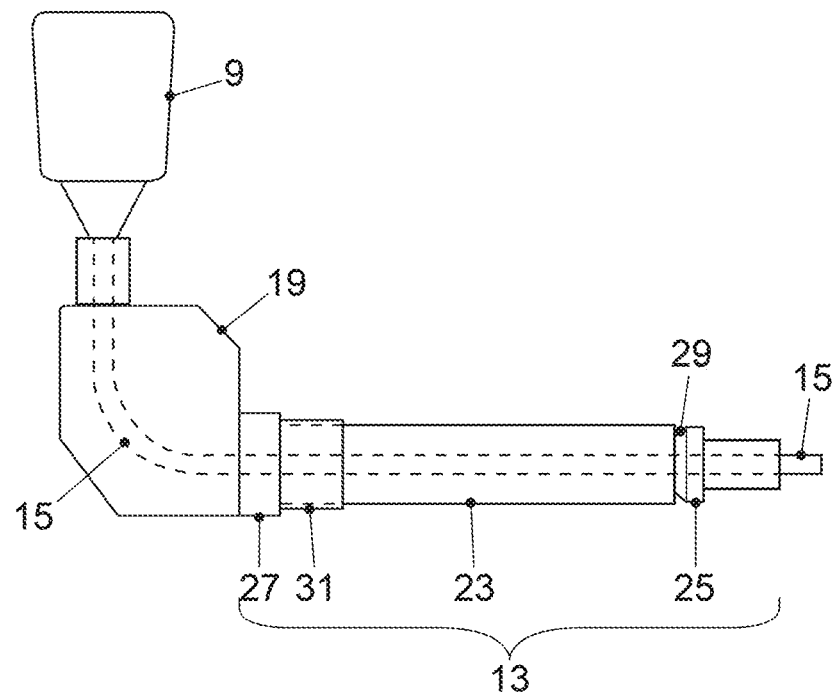
FIG. 2 shows an assembly including the safety belt buckle of the safety belt arrangement and the belt force limiting unit, in isolation.

As is apparent from FIG. 2, the safety belt buckle 9 is attached via a cable 15 and via the belt force limiting unit 13 to a deflection fitting 19, which is mounted on the vehicle body 17 roughly indicated in FIG. 1. Accordingly, the cable 15 is attached at one end to the safety belt buckle 9 and is guided over the vehicle body-side deflection fitting 19 by cable deflection. In the further course, the belt force limiting unit 13 joins, realized as a piston/cylinder assembly having a piston tube 23 and a piston 25. According to FIG. 2, downstream of the deflection fitting 19, the cable 15 is guided through the piston tube 25 and connected to the piston 25, for example through embossment. In its rest position or non-use position shown, the cone-shaped piston tip 29 of the latter is in abutment with an end face of the piston tube 23 facing away from the deflection fitting 19. Therefore, the piston tube 23 is arranged in the axial direction between a cup-shaped stop element 27, which is formed on the deflection fitting 19, and the cone-like piston tip 29, which protrudes partially into the piston tube 23.

In an accident-related vehicle deceleration, the blocking unit blocks the winding drum of the belt retractor 11, preventing the belt from pulling out. If the belt force F acting on the vehicle occupant exceeds a predetermined limit, the piston 25 is displaced about a force limiting path s within the piston tube 23, while expanding and plastically deforming the latter. In this way, the belt force F exerted on the vehicle occupant is limited to a predefined force level. In this case, the maximum possible force limiting path $s_{max}$ corresponds to the piston tube length.

Figure 3:
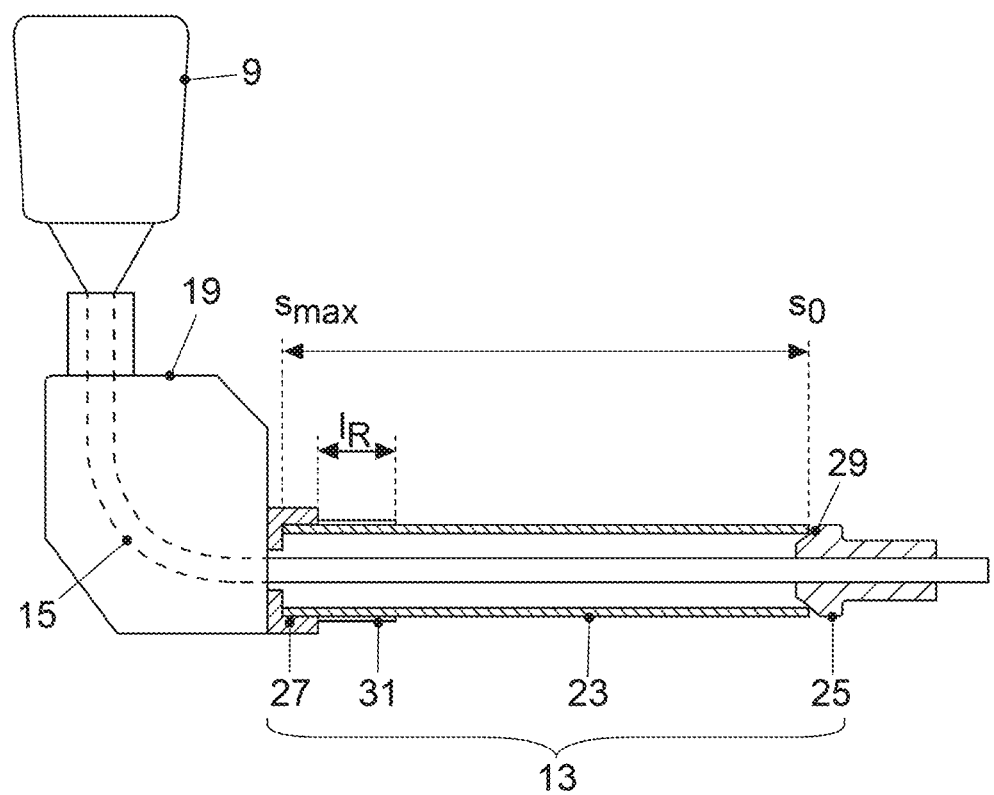
FIG. 3 is a view corresponding to FIG. 2 in a partial sectional view.
Figure 4:
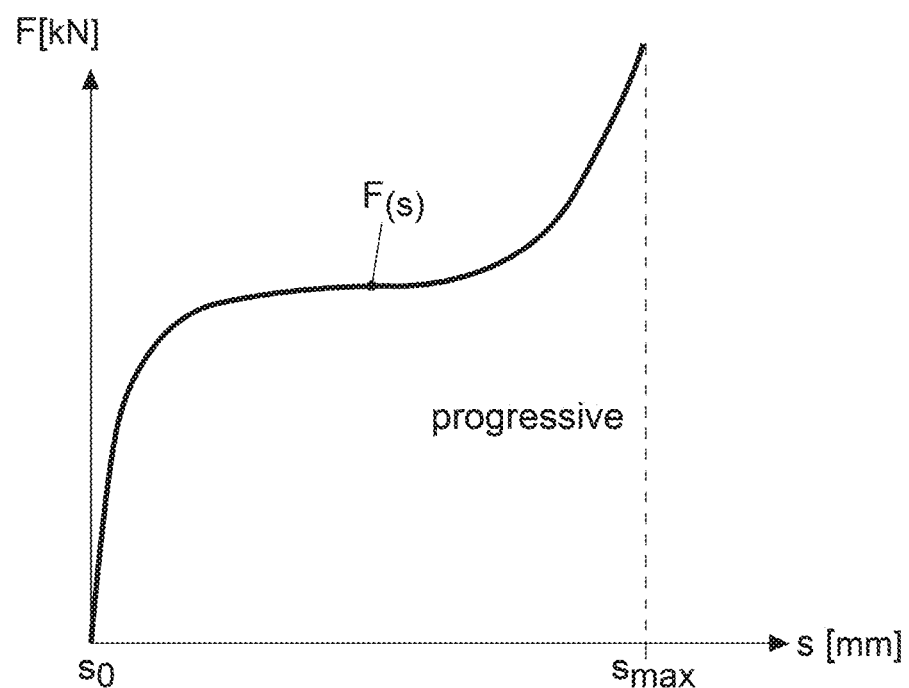
FIG. 4 is a force characteristic curve of the belt force limiting unit shown in FIG. 3.

The belt force level provided by the belt force limiting unit 13 via the force limiting path s is illustrated on the basis of the force characteristic curve shown in FIG. 4. Thus, in the event of the belt force being limited in which the piston 25 is displaced beyond the maximum force limiting path $s_{max}$, it progressively increases. Such a force characteristic curve is set with the aid of a tube element 31, which to form a double tube structure is pushed telescopically onto the piston tube 23 and there, is fixed in the axial direction, for example, by means of an adhesive or embossment connection. In FIGS. 2 and 3, the tube element 31 is positioned on the piston tube 23 at the end of the force limiting path s (i.e., directly at the stop element 27). Purely by way of example, the tube length $I_R$ of the tube element 31 is 10% of the tube length of the piston tube 23. Accordingly, the piston tube 23 comprises a tube section which is enclosed by the tube element 31 and a tube section which is not covered by the tube element 31.

Both on their internal and external circumference side, the piston tube 23 and the tube element 31 have a constant inner and outer diameter over their entire tube length, i.e., a consistently constant thickness of material, and are formed in a smooth cylindrical manner. In order to enable a smooth adjustment of the tube element 31 with a not-yet-implemented adhesive or embossment connection, the inner diameter of the tube element 31 is designed to be greater by a slight play than the outer diameter of the piston tube 23.

Figure 5:
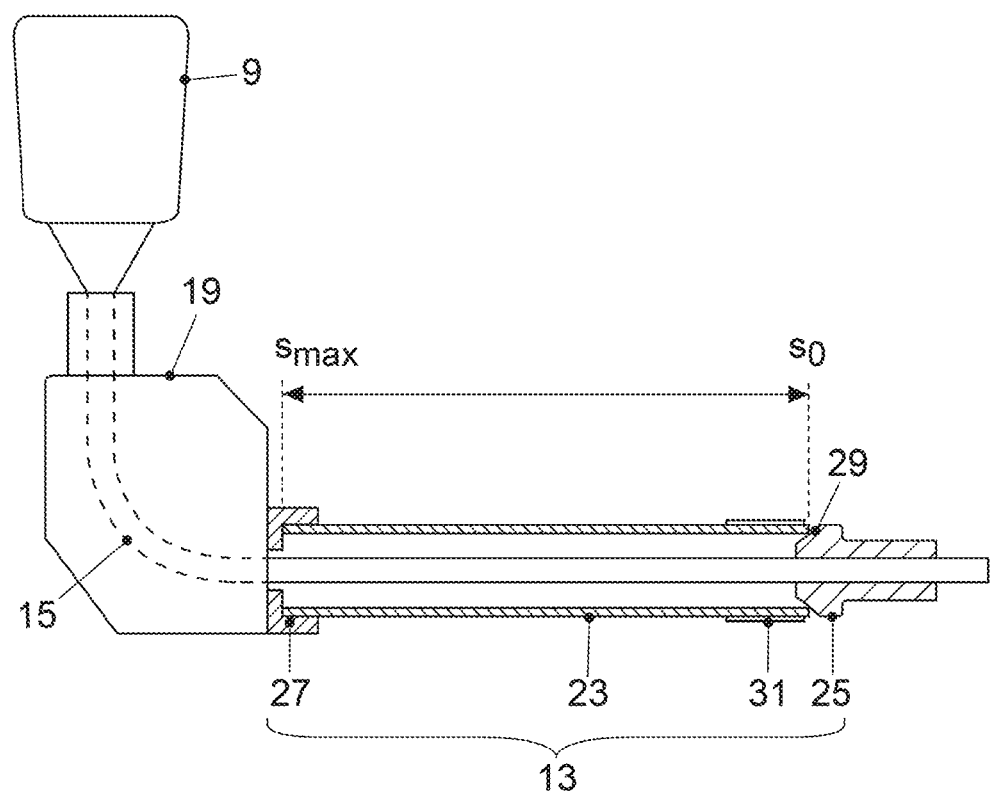
FIGS. 5 and 6 are views according to FIGS. 3 and 4 according to an exemplary embodiment.
Figure 6:
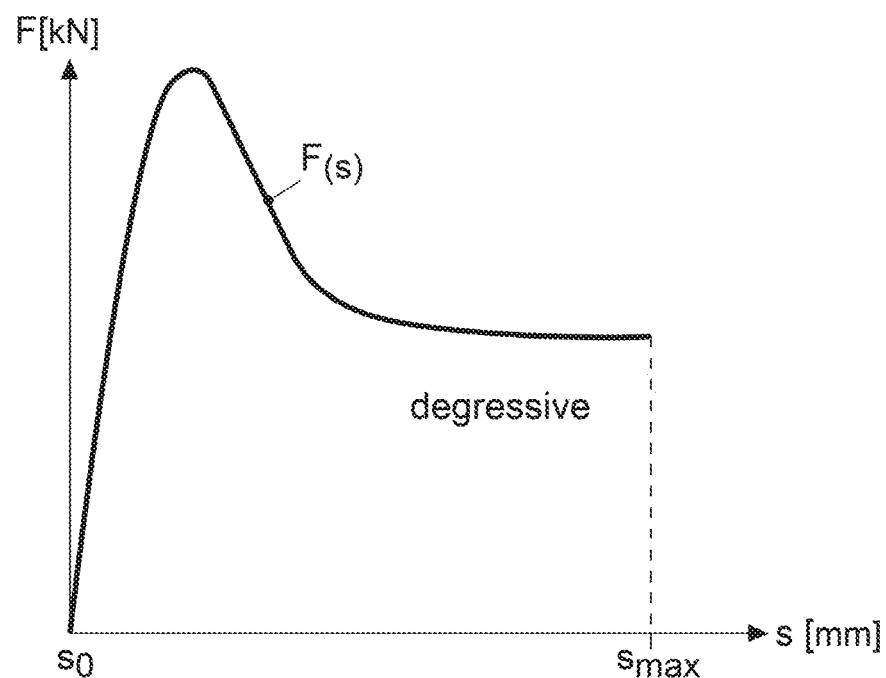
Figure 7:
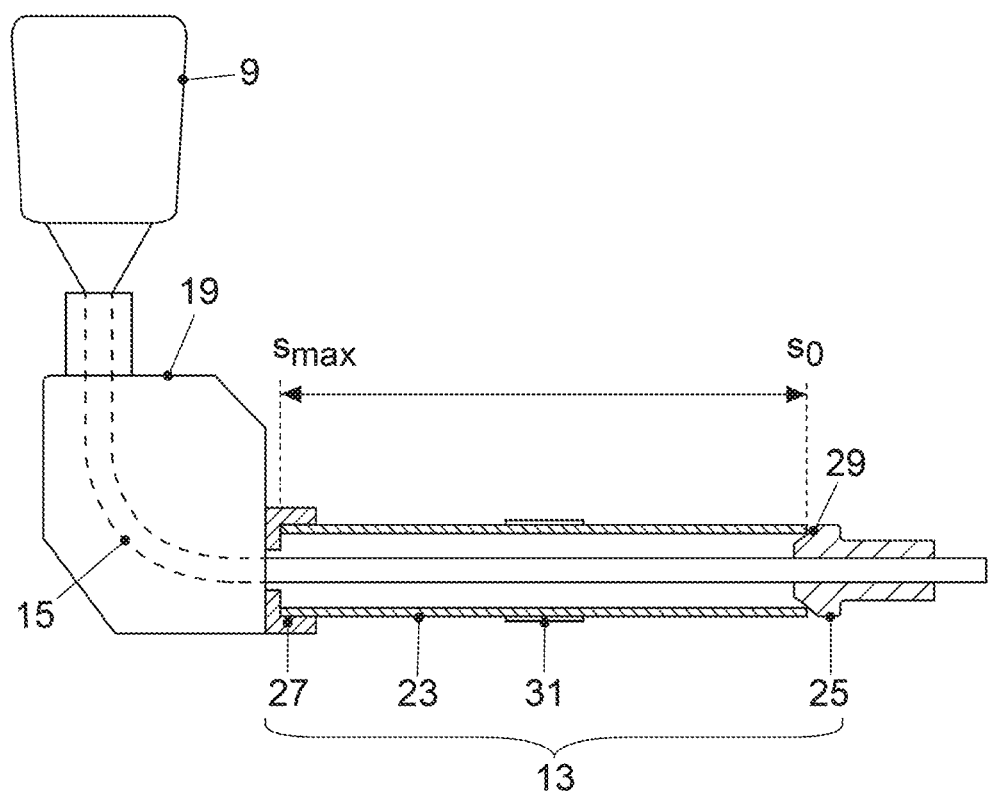
FIGS. 7 and 8 are views according to FIGS. 3 and 4 according to an exemplary embodiment.
Figure 8:
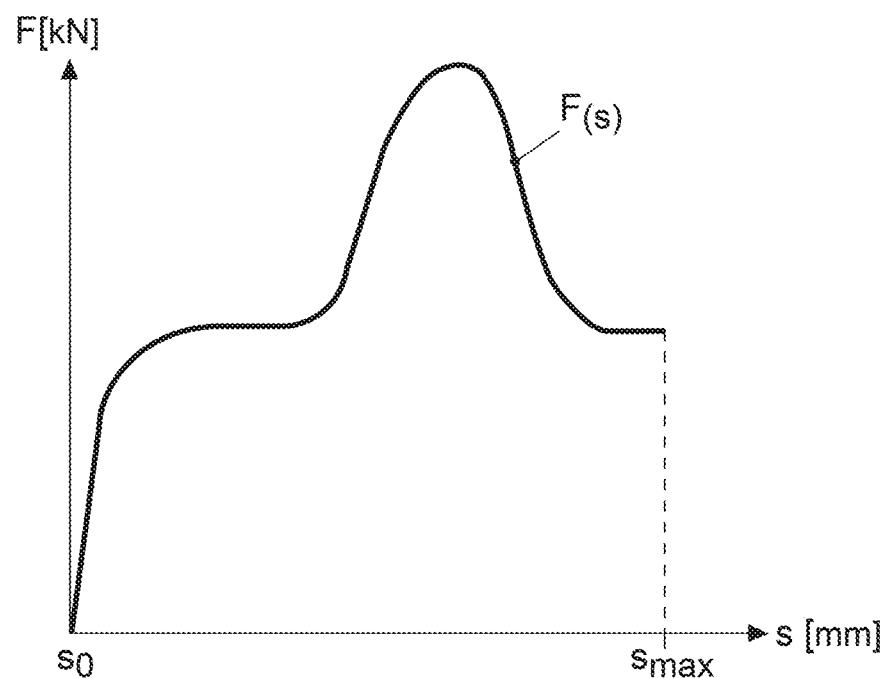

As an alternative to the above exemplary embodiment, in FIG. 5 the tube element 31 is positioned on the piston tube 23 at the beginning of the force limiting path s (i.e., directly on the piston tube end face facing the piston (25)). This creates the force characteristic curve with a degressive force level path F(s) indicated in FIG. 6, in which at the beginning of the belt force limitation, a high force level is established, which is reduced in the further force limiting path. Alternatively, the tube element 31 shown in FIG. 7 is positioned on a middle section of the piston tube 23, whereby the force characteristic curve with a wave-like force level path F (s) indicated in FIG. 8 is obtained.

Figure 9:
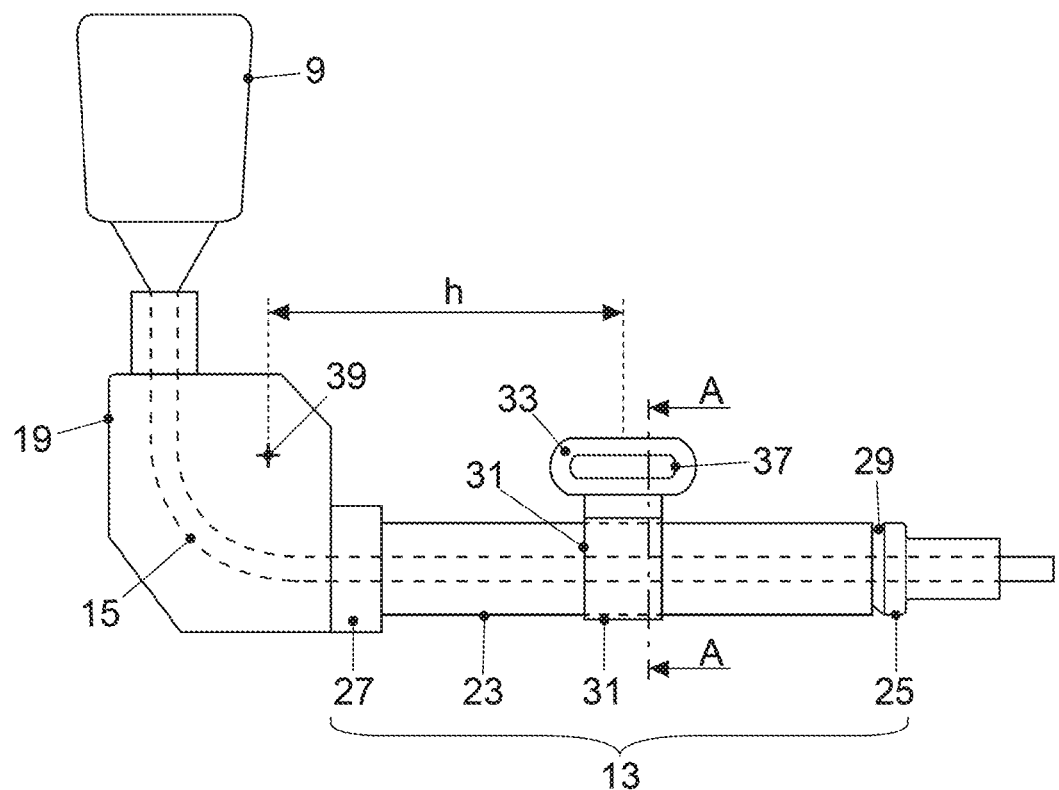
FIG. 9 is a view corresponding to FIG. 2 according to an embodiment.
Figure 10:
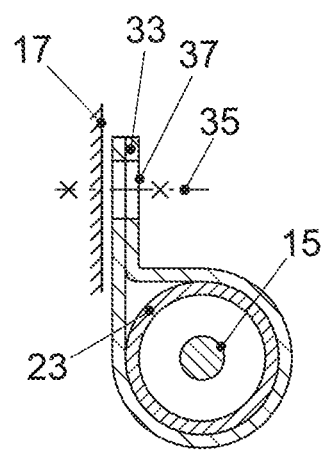
FIG. 10 is a sectional view along the sectional plane A-A of FIG. 9

As an alternative to the preceding exemplary embodiments, a fixed adhesive and/or embossment connection between the tube element 31 and the piston tube 23 is omitted in FIGS. 9 and 10. Instead, in FIGS. 9 and 10, the tube element 31 is realized as a fastening clip with a radially projecting fastening tab 33, which is fastened to the vehicle body 17 via a screw connection 35 (FIG. 10). In this way, the fastening clip 31 remains in loose or easily detachable contact with the piston tube 23 even in the assembled state. For a simple adjustment of the force characteristic curve of the belt force limiting unit 13, the screw hole 37 of the fastening tab 33 is designed as an elongated hole, notably with a longitudinal extent parallel to the axis of the piston tube.

The fastening clip 31 is made in a bending process from a strip-shaped sheet metal part, whose tube section, circular in cross section, circumferentially engages around the piston tube 23 at a predetermined axial position. In FIG. 9, the fastening tab 33 radially projecting outwards from the fastening clip 31 is spaced via a lever arm length h from an attachment point 39, at which the deflection fitting 19 is attached to the vehicle body 17.

In a load event or in the event of the belt force being limited, the assembly shown in FIG. 9, formed of the safety belt buckle 9, the deflection fitting 19 and the belt force limiting unit 13, is acted on by a torque around the point of attachment 39. In this case, the fastening clip 31 acts in a double function as an anti-rotator or torque support, which counteracts the rotation of the assembly.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A safety belt arrangement for a vehicle, comprising:
a belt force limiting unit that is constructed as a piston/cylinder assembly having a piston tube and having a piston, which in an event of a belt force, the piston is displaceable in the piston tube about a force limiting path while expanding and plastically deforming the piston tube, such that the belt force exerted on a vehicle occupant is limited to a predefined force level; and
at least one tube element to set a force level course over the force limiting path, the at least one tube element being pushed telescopically onto the piston tube to form a double tube structure,
wherein an inner diameter of the at least one tube element is greater than an outer diameter of the piston tube by a slight play, and the at least one tube element is fixed at a predefined axial position on the piston tube.

2. The safety belt arrangement according to claim 1, wherein a tube length of the at least one tube element is less than a tube length of the piston tube, so that the piston tube has at least one tube section enclosed by the at least one tube element and at least one tube section not covered by the at least one tube element.

3. The safety belt arrangement according to claim 1, wherein the at least one tube element is fixed at the predefined axial position on the piston tube via an adhesive or embossment connection.

4. The safety belt arrangement according to claim 1, wherein an inner and outer peripheral side of the piston tube is formed with a constant inner and outer diameter in a smooth cylindrical manner over an entire tube length, and the inner and outer peripheral side of the at least one tube element is formed with a constant inner and outer diameter in a smooth cylindrical manner over an entire tube length.

5. The safety belt arrangement according to claim 1, wherein, for a progressive force level course, the at least one tube element is positioned on the piston tube at an end of the force limiting path or, for a degressive force level course, the at least one tube element is positioned at a beginning of the force limiting path on the piston tube, or for a wave-like force level course, the at least one tube element is positioned on a middle section of the piston tube.

6. The safety belt arrangement according to claim 1, wherein, in a fastened state, a belt tongue of the safety belt is in detachable connection with a vehicle-side safety belt buckle, which is fastened via a cable element and via the belt force limiting unit to a vehicle body, and wherein a cable end of the cable element is guided through the piston tube and is connected to the piston.

7. The safety belt arrangement according to claim 6, wherein the cable element is guided via a vehicle body-side fitting by cable deflection, and wherein the vehicle body-side fitting has a support contour against which a side of the piston tube facing away from the piston is supported in the event of the belt force being limited.

8. The safety belt arrangement according to claim 7, further comprising a stop element through which the cable element is guided, the stop element being positioned between the vehicle body-side fitting and the piston tube, wherein a portion of the piston tube is inserted inside of the stop element.

9. The safety belt arrangement according to claim 1, wherein, for a progressive force level course, the at least one tube element is positioned on the piston tube at an end of the force limiting path.

10. The safety belt arrangement according to claim 1, wherein, for a degressive force level course, the at least one tube element is positioned at a beginning of the force limiting path on the piston tube.

11. The safety belt arrangement according to claim 1, wherein, for a wave-like force level course, the at least one tube element is positioned on a middle section of the piston tube.

12. A safety belt arrangement for a vehicle, comprising:

a belt force limiting unit that is constructed as a piston/cylinder assembly having a piston tube and having a piston, which in an event of a belt force, the piston is displaceable in the piston tube about a force limiting path while expanding and plastically deforming the piston tube, such that the belt force exerted on a vehicle occupant is limited to a predefined force level; and at least one tube element to set a force level course over the force limiting path, the at least one tube element being pushed telescopically onto the piston tube to form a double tube structure, wherein the at least one tube element is a fastening clip, which peripherally surrounds the piston tube at a predefined axial position, the at least one tube element has a fastening tab projecting radially outwards, via which the at least one tube element is fastened to an adjoining component of a vehicle body, wherein the fastening tab of the tube element has an elongated hole for screwing to the adjoining component of the vehicle body, and wherein a longitudinal extension of the elongated hole is aligned axially parallel to the piston tube.

\* \* \* \* \*